July 5, 1938.  J. F. G. M. L. CHARPENTIER  2,123,096

AEROPLANE

Filed March 23, 1936  4 Sheets-Sheet 1

J. F. G. M. L. Charpentier
INVENTOR

By: Glascock Downing & Seebold
Attys.

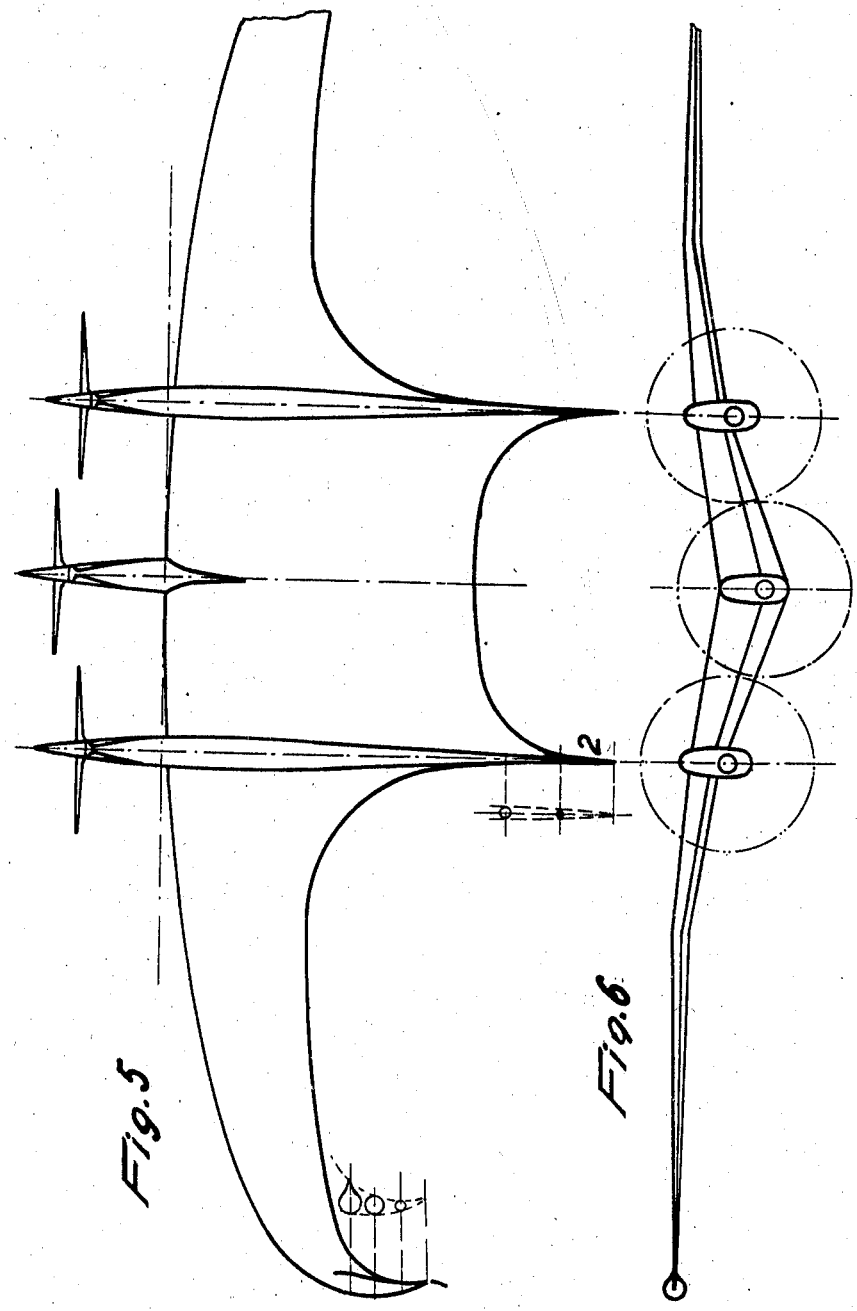

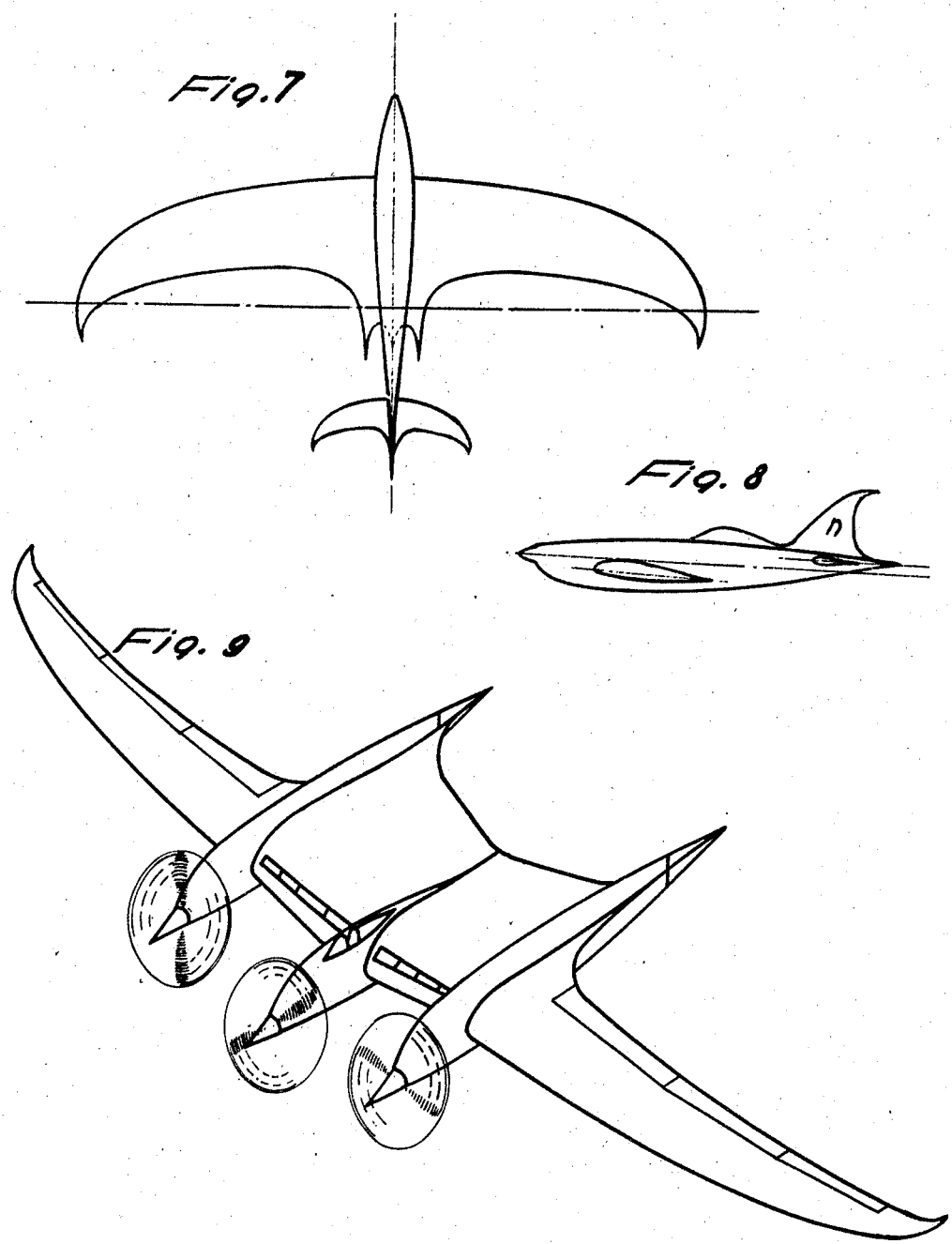

Patented July 5, 1938

2,123,096

UNITED STATES PATENT OFFICE 2,123,096

AEROPLANE

Jean Frédéric Georges Marie Léon Charpentier, Saint-Cloud, France

Application March 23, 1936, Serial No. 70,521
In France March 22, 1935

2 Claims. (Cl. 244—130)

(Granted under the provisions of sec. 14, act of March 2, 1927; 357 O. G. 5)

My invention relates to improvements in the shape of rigid aeroplane wings with a view to providing a better flow of air over said wings causing the lines of flow to converge beyond the body considered and preventing the formation of a vortex and eddies to the rear thereof.

According to my invention there are provided on the wing considered one or more narrow conical tips the general direction of which is substantially contrary to the normal direction of motion of said wing or tip; such narrow conical tips have a cross-section which decreases very gradually in size in all radial directions down to zero at their free ends.

Preferably, in the case of a wing provided with forwardly convex leading and trailing edges this direction is comprised between that of the tangents to the leading and trailing edges at their points of meeting which tangents each form a very small angle with the axis of symmetry of the wing.

In the accompanying drawings given by way of example:

Figs. 1 to 4 relate to the general shape of the wing.

Figs. 5 and 6 are plan and front views of an aeroplane provided with elongated points at the extremities of the wing.

Figs. 7 and 8 are plan and side views of a modification.

Fig. 9 relates to a modification.

Figure 10:
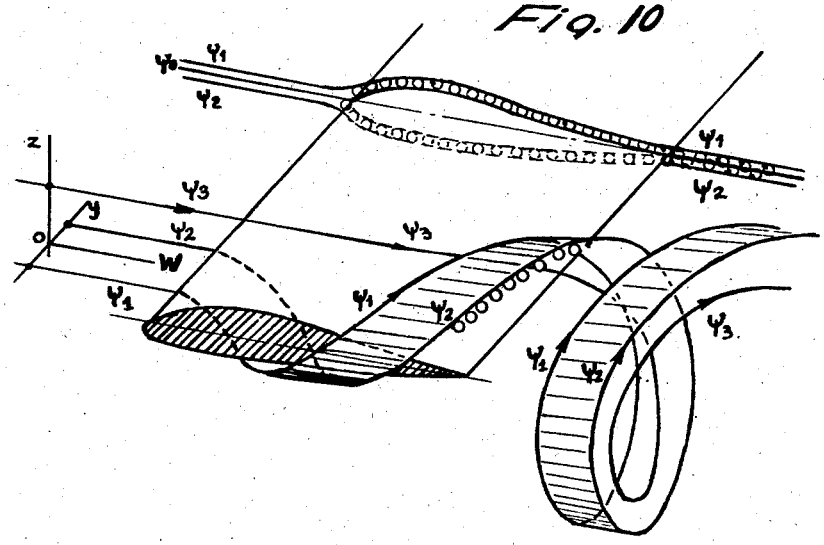
Figure 11:
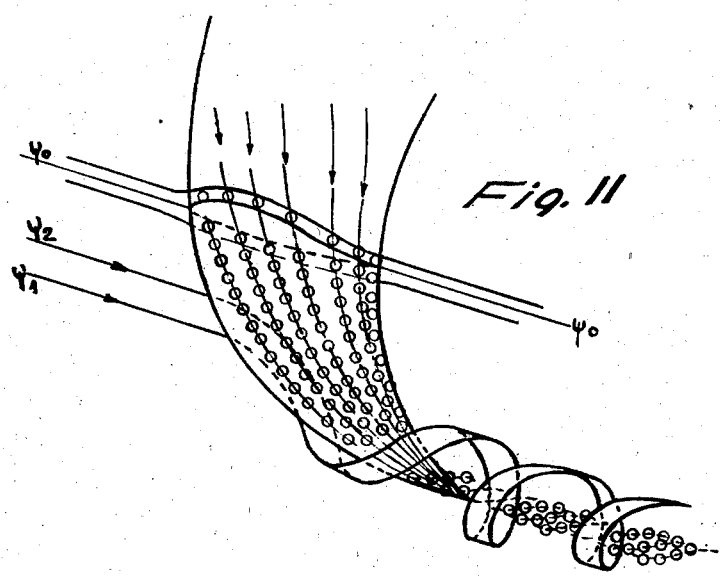

Figs. 10 and 11 are explanatory diagrams relating to the designing of points on wings and like surfaces.

As stated above it is of considerable advantage to make the leading and trailing edges of an aeroplane wing intersect at both ends at a sharp angle so as to form a rearwardly directed point. In the case for instance of an elliptic crescent-shaped wing formed by two complete half-ellipses having the same longer axis, this point is parallel to the plane of symmetry of the aeroplane. The point thus formed has for its object to guide along the trailing edge the flow of the intense eddying volume of air to the rear of the wing surface and to limit the movement of this volume of air to that of rotary tails so as to suppress interactions between the elementary flows to the rear of the trailing edge beyond which the lines of flow passing over the upper and lower wing surfaces converge immediately.

Figure 1:
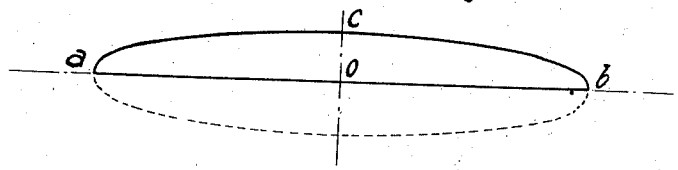
Figure 2:
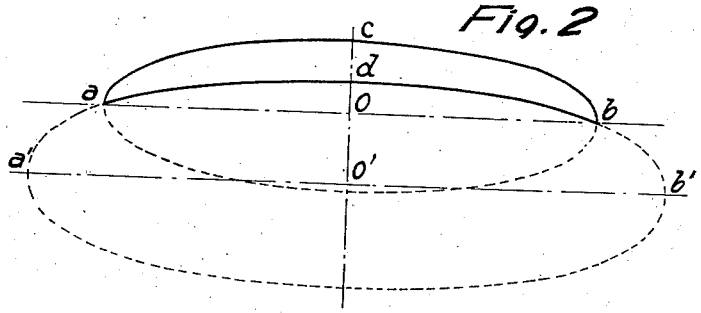
Figure 3:
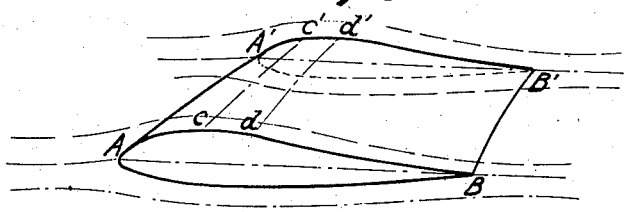
Figure 4:
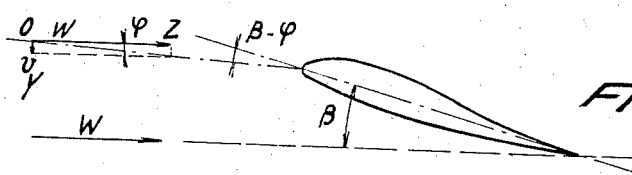

Returning to Figs. 1 to 4 the leading edges ($a$, $c$, $b$, Figs. 1 and 2) and the trailing edges ($a$, $o$, $b$—$a$, $d$, $b$, Figs. 1 and 2) are shown as formed by connecting the points of critical speed ($A$, $A'$ and $B$, $B'$ on Fig. 3) of the directing profile of the wing considered, i. e. the points corresponding for zero lift to the points of zero speed on the transformation circle considered.

On the other hand, as the different directing profiles of the wing considered belong to a same family characterized by its transformation function and as these profiles have no angle of incidence one with reference to the other by reason of their directions of zero lift being all parallel, the flow throughout the spread is of the same nature.

I will also suppose that Prandtl's theory concerning wings of limited area is true.

In each section the movement is equivalent to a plane movement the speed at the infinite of which has two components (Fig. 4) to wit $W$ along $OZ$ and $V$ along $OY$ and this modifies the flow which instead of being $$\Gamma = 4\pi \alpha W \sin B = \pi L(1+E) WB = KlWB$$

becomes $\Gamma = KlW(B - V/W)$ now $V/W = tg\varphi$. Outside the carrier eddy and the zone of free eddies, the speeds derive from a potential; the components $u$ and $v$ of the speed along the directions $ox$ and $oy$ are (1) $$u = \frac{\partial \phi}{\partial x} \text{ and } v = \frac{\partial \phi}{\partial y}$$

The equation of continuity is of the form (2) $$\frac{\partial u}{\partial x} + \frac{\partial v}{\partial y} = \frac{\partial^2 \phi}{\partial x^2} + \frac{\partial^2 \phi}{\partial y^2} = \Delta \phi = 0$$

$\varphi$ is thus a harmonic function satisfying Laplace's conditions for a conservation flux.

The equation of the lines of flow $$\frac{dx}{du} = \frac{dy}{dv} \text{ or } -vdx + udy = 0$$

is a total exact differential as the equation of continuity $$-\frac{\partial v}{\partial y} = \frac{\partial u}{\partial x} \text{ shows } -vdx + udy = \frac{\partial \psi}{\partial y}dx + \frac{\partial \psi}{\partial y}dy = d\psi$$

consequently $$\begin{cases} \frac{\partial \psi}{\partial y} = u = \frac{\partial \phi}{\partial x} \\ -\frac{\partial \psi}{\partial x} = v = \frac{\partial \phi}{\partial y} \end{cases}$$

The equipotential curves $\varphi =$ constant and the current lines i. e. the curves representing the flow $\psi$ constant, form a system of orthogonal lines. The function $f(z)=\varphi+i\psi$ is a compound potential the derivative of which $$\frac{df}{dz}=\frac{df}{dx}=\frac{\partial\phi}{\partial x}+i\frac{\partial\psi}{\partial x}=u-iv$$

is the compound speed. These conditions being satisfied, the current lines $\psi$ being orthogonal to the potential lines $\varphi$ for each profile, the connection between the points on the different profiles of a wing where the potentials have the same value will give out the equipotential lines of the wing surface considered. The current lines are orthogonal to the leading and trailing edges where the equipotential lines of each profile are normal to the profile. The shape of the wing in plan view has thus a great influence on the inflexions of the current lines.

If I first consider a wing outline with symmetrical leading and trailing edges, such as the elliptic outline and I next consider a transformed outline obtained for instance by a centering at 30% of the depth of the outline as in most wings of to-day, the divergence is reduced to the rear and increases to the front under the direct dependance of the curvature of the trailing edge.

Now the divergence between the current lines in front of a solid moving in a stationary fluid, absorbs less energy than the divergence of the lines to the rear. The reason is that the lines to the front affect the stationary fluid and that the lines to the rear affect a fluid to which the action of the wing has impressed a certain amount of movement. It is therefore of interest to suppress the divergences to the rear and to tolerate those to the front. To obtain this result I provide the general shape of which a particular form of execution is that of a half-ellipse (Fig. 1) and which is improved according to invention by the provision of rearwardly directed points.

Figs. 5 and 6 are plan and front views of an aeroplane wherein fine points are provided at the lateral extremities of the wing and at the tail ends of the fuselage. These points are substantially conical and their axis is parallel to the longitudinal axis of the aeroplane. I have shown next to the point 1 of the left hand end of the wing and next to the left point 2 of the fuselage a succession of cross-sections of these points together with the curve enveloping these cross-sections so as to make the shape of these points appear clearly. It should be noted that the leading and trailing edges merging with the horizontal generatrices of a common conical point both turn their convexity towards the front.

Figs. 7 and 8 are plan and side views of a similar aeroplane provided with a vertical tail unit or fin and a wing ending in conical points.

Fig. 9 is a perspective view of another aeroplane with points at the ends of the wing and of the two vertical partitional fins. I may give the fins the shape shown in Fig. 9 in which they pass beyond the upper and lower wing surfaces and end with a point comparatively far to the rear of the trailing edges of the wing, whereby they separate the flow over the different elements.

The fins have gradually varying cross-sections which may be circular or elliptic towards the front and become gradually smaller and nearer their plane of symmetry as the fins are considered more to the rear; the sides of the fins become flatter and flatter towards the rear.

The circular penetration of the fins is the most advantageous as its stability-reducing action due to its arrangement to the front of the centre of gravity is then the smallest along the three directions of space.

This shape of a partitional fin is particularly of advantage for military machines where it does away with all blind firing angles for machine guns or ordnance adapted to fire rearwards.

My improved wings provide a rational and economical manner of removing the boundary layer of air passing over the wing surfaces to the rear. Fig. 11 shows the rear point of a wing round which the boundary layer is sucked and drawn rearwards inside the tubular eddy formed round it. In the case of a normal wing (Fig. 10) the boundary layer is only drawn rearwards along the outer edges of the wing. The currents of air are shown in both Figs. 10 and 11 by the lines $$\psi_0, \psi_1 \ldots$$

Consequently for small angles of attack the wake of the current of air over the wing of Fig. 10 is merely, even for zero lift, a Karmann's flow, i. e. a stable system of two sheets of eddying particles. A rotary flow constantly risks being formed and it is of major interest to prevent the boundary layer from forming a wake, as with increasing angles of attack, the particles at the core of the system draw along with them the adjacent particles and form transverse eddies which lead to breaking away of the flow.

The guided removal of the boundary layer along points as in Fig. 11 allows the moment of the breaking away of the flow to be delayed, said breaking away being produced by an increase of speed and/or an increase of the angle of attack. My improved device allows resistance to breaking away of the flow at very high speeds near speed of sound.

What I claim is:

1. An aeroplane wing bounded by a leading and a trailing edge, both convex towards the front and the common ends of which are substantially parallel to the longitudinal axis of symmetry of the wing, said common ends forming a substantially conical point directed rearwardly and in parallelism with the said axis of symmetry.

2. In an aeroplane wing as claimed in claim 1, the provision of symmetrically arranged partitional fins extending above and below the wing and ending rearwardly with a substantially conical point parallel to the longitudinal axis of symmetry.

JEAN FRÉDÉRIC GEORGES
MARIE LÉON CHARPENTIER.